United States Patent [19]

Tobishima et al.

[11] Patent Number: 4,737,424

[45] Date of Patent: Apr. 12, 1988

[54] SECONDARY LITHIUM BATTERY

[75] Inventors: Shin-ichi Tobishima; Masayasu Arakawa; Toshiro Hirai; Jun-ichi Yamaki, all of Mito, Japan

[73] Assignee: Nippon Telegraph & Telephone Corporation, Tokyo, Japan

[21] Appl. No.: 925,379

[22] Filed: Oct. 31, 1986

[30] Foreign Application Priority Data

| | | | |
|---|---|---|---|
| Nov. 1, 1985 | [JP] | Japan | 60-245718 |
| Mar. 20, 1986 | [JP] | Japan | 61-63018 |
| Mar. 25, 1986 | [JP] | Japan | 61-64959 |
| Mar. 25, 1986 | [JP] | Japan | 61-64960 |
| Mar. 25, 1986 | [JP] | Japan | 61-64961 |

[51] Int. Cl.$^4$ ............................................. H01M 6/16
[52] U.S. Cl. .................................... 429/197; 429/218
[58] Field of Search ............... 429/197, 196, 195, 194, 429/199

[56] References Cited

U.S. PATENT DOCUMENTS

| | | | |
|---|---|---|---|
| 3,960,595 | 6/1976 | Lehmann et al. | 429/197 |
| 4,056,663 | 11/1977 | Schlaikjer | 429/197 |
| 4,086,403 | 4/1978 | Whittingham et al. | 429/194 |
| 4,118,550 | 10/1978 | Koch | 429/194 |
| 4,129,691 | 12/1978 | Broussely | 429/197 |
| 4,184,017 | 1/1980 | Kelsey et al. | 429/197 |
| 4,385,103 | 5/1983 | Louzos et al. | 429/197 |

FOREIGN PATENT DOCUMENTS 0154478  8/1985  Japan ................................. 429/197

OTHER PUBLICATIONS

Electrochimica Acta, vol. 29, No. 10, pp. 1471–1476 (1984), Ethylene Carbonate/Ether Mixed Solvents Electrolyte for Lithium Batteries, S.–I. Tobishima et al.
Electrochimica Acta, vol. 30, No. 12, pp. 1715–1722 (1985), Lithium Cycling Efficiency and Conductivity for High Dielectric Solvent/Low Viscosity Solvent Mixed Systems, Shin–ichi Tobishima et al.
Electrochimica Acta, vol. 29, No. 2, pp. 267–271 (1984), Ethylene Carbonatepropylene Carbonate Mixed Electrolytes for Lithium Batteries, Shin–ichi Tobishima et al.

Primary Examiner—Anthony Skapars
Attorney, Agent, or Firm—Oblon, Fisher, Spivak, McClelland & Maier

[57] ABSTRACT

The present invention provides an electrolyte for use on a secondary lithium battery comprising amorphous $V_2O_5$ base cathode active material, a metallic lithium base active material, and an electrolytic solution lithium salt dissolved in a mixed organic solvent. The organic solvent is ethylene carbonate mixed with one organic solvent of 2-methyltetrahydrofuran, 2,5-dimethyltetrahydrofuran, 1,3-dioxalan, 4-methyl-1,3-dioxalan, 1,2-dimethoxyethane, etc. The mixed ratio of ethylene carbonate ranges within 10 to 50%, and water content of the electrolytic solution ranges within 400 to 5 ppm, and the content of impurities other than water ranges within 1000 to 10 ppm. The resultant secondary lithium battery is excellent in charge-discharge cycle life.

20 Claims, 7 Drawing Sheets

SECONDARY LITHIUM BATTERY

BACKGROUND OF THE INVENTION

1. Field of the Invention

The present invention relates generally to a secondary lithium battery, and particularly to a secondary lithium battery containing an organic electrolyte.

2. Prior Art

The lithium battery has a high standard electrode potential, i.e. −(minus)3.03 volts based on the normal hydrogen electrode, and thus has an extremely high cell reducing power. In addition, since the atomic weight of lithium is so small as 6.941, the capacity of the cell per unit weight is so large as 3.86 Ah/g. Thus, many researches and studies have been made on batteries wherein lithium is used as the anode material, such a cell or battery being referred to as lithium battery throughout the specification and claims of this invention. As the fruits of the researches, lithium batteries having cathode active materials made of $MnO_2$ (manganese dioxide) or $(CF)_n$ (polyfluorocarbon) have been commercially available. However, such commercial products are primary batteries, and rechargeable lithium batteries for practical uses have not yet been developed. By the provision of a lithium battery, which can be recharged while retaining its favourable high eneregy density discharge characteristics, a lithium battery having exceedingly superior features over those of the conventional batteries could be realized with attendant effect that such a battery may be applied for portable electronic instruments.

It is desirous in view of the practical applications that a nonaqueous electrolyte is used in a lithium battery which is operated in room temperature. However, the conductivity of such an electrolyte is, in general, lower than those of the aqueous electrolytes used in the prior art batteries by one or two ciphers. Under these circumstances, it has been proposed to use electrolytes having high conductivity for applying those for primary lithium batteries. Examples of such electrolytes known in the art are those prepared by admixing ethers to propylene carbonate, ethylene carbonate, γ-butyrolactone or the like and disclosed by U.S. Pat. No. 4,129,691 (1978), and the specifications of Japanese Patent Application Nos. 38030/1976 and 40529/1976. On the other hand, U.S. Pat. No. 4,056,663 (1977) discloses an electrolyte composed of ethylene carbonate and an ester.

On the other hand, it is required that the charge-discharge efficiency of lithium is high in a secondary lithium battery. Lithium reacts with organic solvents thermodynamically to form films on the surface of lithium. The charge-discharge efficiency of the secondary lithium battery is seriously affected by the rate of formation of the film and the properties thereof. In other words, in a secondary lithium battery, the charge-discharge efficiency of lithium has no connection with the conductivity of the used organic solvent, and in fact the charge-discharge efficiencies of lithium in almost all electrolytes practically used in prior art primary batteries are low and thus cannot be used as the electrolytes in a secondary battery. It has already been proposed to use, as the electrolyte in secondary batteries, $LiAsF_6$/2-methyltetrahydrofuran (U.S. Pat. No. 4,118,550) and $LiClO_4$/1,3-dioxolan (U.S. Pat. No. 4,086,403). The charge-discharge efficiency is increased particularly by the use of 2-methyltetrahydrofuran. This is because a lithium surface film different from the surface film formed by pure 2-methyltetrahydrofuran, when a lithium surface film is compared with that formed in the presence of 2-methylfuran contained in the 2-methyltetrahydrofuran as an impurity. (See J. Electrochem. Soc., vol. 131, 2197 (1984).) It is also reported that the charge-discharge efficiency may be improved by propylene carbonate (Electrochim. Acta, vol. 22, 75 (1977), methyl acetate (Electrochim. Acta, vol. 22, 85 (1977) or tetrahydrofuran (J. Electrochem., Soc., vol. 125, 1371 (1978) in case where water is added. It has been further proposed to use an ethylene carbonate system mixed with an ether as the electrolyte having relatively high charge-discharge efficiency. (See Electrochim. Acta, vol. 30, 1715 (1985) and the specification of Japanese Patent Application No. 206573/1982.) However, these known references neither explicitly disclose the influences of impurities contained in ethylene carbonate/ether system mixed solvents. Nor is there any trial to improve the composition of the lithium surface film.

SUMMARY OF THE INVENTION

Accordingly, the object of this invention is to provide an electrolyte for use in a secondary lithium battery, which is excellent in charge-discharge cycle life.

The present invention provides a secondary lithium battery comprising: an anode active material selected from the group consisting of lithium, lithium ion dischargeable lithium alloys and lithium-doped high polymers; a cathode active material reacting with lithium ions through electrochemically reversible reaction; and an electrolytic solution containing one or more lithium salts dissolved in an organic solvent; said organic solvent being a mixed solvent essentially consisting of highly pure ethylene carbonate and a polar aprotic solvent.

It is required that the electrolytic solution used in a secondary lithium battery should have a high charge-discharge efficiency. As described above, lithium reacts with the electrolytic solution to form a film on the surface of lithium. The charge-discharge characteristics of lithium are significantly affected by the formation rate, ion conductivity, electron conductivity, porosity and other physical properties including mechanical strengths of the thus formed film. As will be described hereinafter, a very high charge-discharge efficiency of lithium is exhibited when a highly pure solvent containing ethylene carbonate is used. It is considered that this is due to the fact that the lithium surface film formed by ethylene carbonate is advantageous for charge-discharge cycle. However, ethylene carbonate has a melting point of about 36° C., which hinders solitary use thereof at normal temperature. In order to use ethylene carbonate as the electrolyte without damaging the favourite properties thereof, ethylene carbonate is mixed with a dipolar aprotic solvent, according to one important feature of this invention.

Examples of such polar aprotic solvent include tetrahydrofuran and derivatives thereof, 1,3-dioxolane and derivatives thereof, compounds having a polar double bond such as $>C=O$ and $>S=O$, dialkoxyethanes and acetonitrile. Examples of derivative of tetrahydrofuran are 2-methyltetrahydrofuran and 2,5-dimethyltetrahydrofuran. Preferable derivatives of 1,3-dioxolane are compounds each containing alkyl group having 1 to 4 carbon atoms. Derivatives of 1,3-dioxolane having more than 5 carbon atoms are low in conductivity and increased in viscosity, and thus cannot form electrolytes advantageously used in the lithium battery. Specific examples of preferred derivative of 1,3-dioxolane are 2-methyl-1,3-dioxolane, 4-methyl-dioxolane, 2-ethyl-1,3-dioxolane, 4-ethyl-1,3-dioxolane, 2,4-diethyl-1,3-dioxolane and 2-methyl-4-ethyl-1,3-dioxalane.

Specific examples of the compounds having polar double bonds, such as $>C=O$ and $>S=O$ are propylene carbonate, γ-butyrolactone, γ-valerolactone, γ-octanoic lactone, 3-methyl-2-oxazolidinone, sulfolane, 3-methylsulfolane, dimethylsulfoxide, methyl acetate and methyl formate.

Dialkoxyethanes, which may be preferably used in this invention, include dialkoxyethanes each containing an alkyl group having 1 to 4 carbon atoms. Dialkoxyethanes having more than 5 carbon atoms are low in conductivity and increased in viscosity, and thus cannot form electrolytes advantageously used in the lithium battery. Specific examples of preferred dialkoxyethane are 1,2-dimethoxyethane, 1,2-diethoxyethane, 1,2-dibutoxyethane, 1-methoxy-2-ethoxyethane, 1-methoxy-2-propoxyethane, 1-methoxy-2-n-butoxyethane and 1-methoxy-2-isobutoxyethane.

According to another important feature of this invention, 10 to 50%, by volume, of a mixed solvent of ethylene carbonate with 2-methyltetrahydrofuran should be preferably shared by ethylene carbonate, the improvement both in charge-discharge efficiency and conductivity is not satisfactory when either the ratio of ethylene carbonate in the mixed solvent is less than 10% by volume since the properties of the mixed solvent approach those of the system containing only 2-methyltetrahydrofuran, or the ratio of ethylene carbonate in the mixed solvent exceeds 50% by volume since the properties of the mixed solvent approach those of substantially pure ethylene carbonate to result in insufficient impovement in charge-discharge efficiency and conductivity.

According to this invention, ethylene carbonate is mixed with any of the derivatives of 1,3-dioxolane, compounds each having a polar double bond such as $>C=O$ or $>S=O$, dialkoxyethanes preferably in a mixing ratio of from 10 to 60%, by volume. If the mixing ratio by volume is less than 10%, the behavior of mixed solvent approaches to the case where a dipolar aprotic solvent is used singly whereas the behavior of the mixed solvent when the ratio of ethylene carbonate exceeds 60% by volume it approaches to that in the case where ethylene carbonate is used singly, resulting in insufficient improvement both in charge-discharge efficiency and in conductivity.

Preferable examples of lithium salt which is dissolved in the aforementioned mixed solvent, according to a further feature of this invention, are $LiAsF_6$, $LiClO_4$, $LiBF_4$, $LiSbF_6$, $LiPF_6$, $LiAlCl_4$, $LiCF_3SO_3$ and $LiCF_3CO_2$. Such a lithium salt is added to ethylene carbonate such that the content of lithium salt ranges within 0.5 to 2.0 mol/l(M). This is because the conductivity is lowered with serious reduction in charge-discharge efficiency of lithium, if the content is out of this range.

The water content of the electrolytic solution in the present invention should be preferably within 400 to 5 ppm. If the water content is more than 400 ppm, the charge-discharge efficiency is considerably lowered. Ethylene carbonate and the selected polar aprotic solvent to be mixed therewith are purified, for example, by precise distillation, molecular sieve treatment or treated with activated carbon. The impurities, other than water, are organic compounds which may be quantitatively analyzed through gas chromatography. The charge-discharge efficiency becomes better, as the content of impurities other than water is decreased. The content of impurities other than water should be 18,000 to 10 ppm. If the content of impurities, other than water, is more than 18,000, the charge-discharge efficiency might be seriously lowered.

The anode active material used in the secondary lithium battery of this invention is selected from the group consisting of lithium, lithium ion dischargeable lithium alloys and lithium-doped high polymers.

The cathode active material used in this invention is a material which reacts with lithium ions through electrochemically reversible reaction. Preferable examples of such a material include amorphous materials mainly composed of $V_2O_5$, amorphous $Cr_3O_8$, $Cu_4Mo_6S_8$, $Cu_3Mo_6S_{7.9}$, $MoS_2$, $MoS_2$ with oxidized surface, $MoS_2$ containing Li, $Cr_{0.5}V_{0.5}S_2$, $NbSe_3$, $TiSe_3$, $TiS_2$, $V_6O_{13}$, $NiPS_3$, amorphous $MoS_3$, $Cu_2V_2O_7$, $Li_{1+x}V_3O_8$ ($0<x\leq1$). Preferred amorphous materials mainly composed of $V_2O_5$ are substantially pure $V_2O_5$ or $V_2O_5$ added with at least one selected from the group consisting of $P_2O_5$, $TeO_2$, $Sb_2O_3$, $Bi_2O_3$, $GeO_2$, $B_2O_3$, $MoO_3$, $WO_3$ and $TiO_2$. These amorphous materials may be prepared by mixing $V_2O_5$ with a selected material, for example $P_2O_5$, and then melted followed by quenching.

In order to increase the solubility of a solute in the mixed solvent used in this invention, an additive may be added in a mixing ratio of less than 50% by volume, based on the total volume of the electrolytic solution. Examples of additives which may be used for such a purpose are hexamethyl phosphoric triamide, N,N,N',N'-tetramethylethylenediamine, diglyme, triglyme, tetraglyme, 1,2-dimethoxyethane and tetrahydrofuran. If the amount of the additive exceeds 50%, by volume, it constitutes one of the main ingredients, so that the aimed object cannot be achieved.

EXAMPLES OF THE INVENTION

The present invention will now be described in detail with reference to specific Examples thereof.

EXAMPLE 1

1.5M $LiAsF_6$-ethylene carbonate(EC)/2-methyltetrahydrofuran (2-MeTHF) (mixed in a ratio by volume of 1/1) was refined or purified by removing water and impurities, such as 2-methylfuran and other organic compounds, to prepare an electrolytic solution. A secondary lithium battery was prepared from the electrolytic solution following to the procedure as will be described below.

The cathode was prepared from a dipolarizing mix pellets for cell (16 mm$\phi$) composed of 70 wt % of an amorphous $V_2O_5$ having a composition of 95 mol % $V_2O_5$-5 mol % $P_2O_5$, 25 wt % of acetylene black as a conductive agent, and 5 wt % of Teflon as a binder. Metallic lithium (17 mm$\phi$, 15 mAh) was used as the anode. A microporous polypropylene sheet acting as a separator was used together with the aforementioned materials to produce a coin-shape lithium battery.

Figure 1:
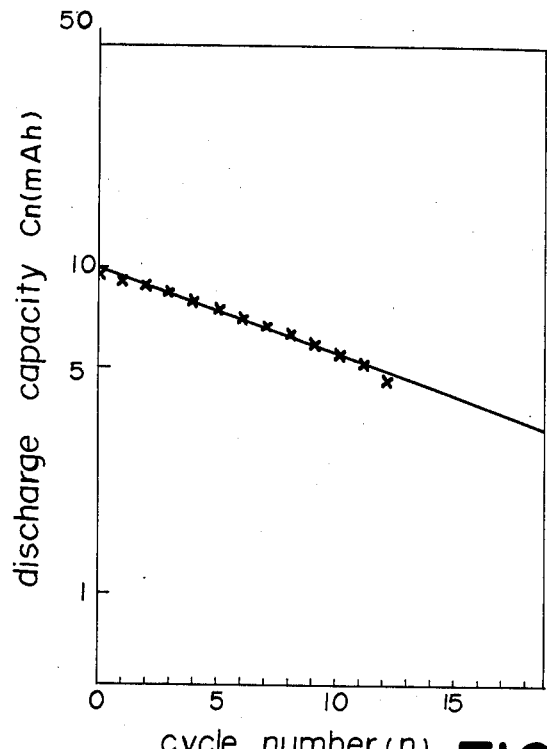
FIG. 1 is a graph showing the discharge capacity in terms of the cycle number of a Li/amorphous $V_2O_5$-$P_2O_5$ cell wherein 1.5 mol $LiAsF_6$-EC/2MeTHF(1/1) is used.

The lithium battery was subjected to the charge-discharge cycle test at a current value of 1 mA and at a voltage of from 2 to 3.5 volts. The charge-discharge characteristic of the used electrolytic solution was appraised by the change in discharge capacity. The result is shown in FIG. 1. As shown, excess lithium which can participates in the discharge operation is consumed at the anode so that the discharge capacity is decreased in proportion to the charge-discharge efficiency E. Such a decrease in discharge capacity is substantially constant, when excess lithium is present, and does not depend on the cathode active material. Let the charge-discharge efficiency be E, the discharge capacity at the n-th cycle may be represented by the following equation of:

$$C_n = E \times C_{n-1}$$

which leads to $$\ln C_n = (n-1) \ln E + \ln C_1$$

From the equation set forth above, the charge-discharge efficiency may be calculated.

While varying the contents of water and other impurities in the electrolytic solution prepared by using the EC:2MeTHF, the charge-discharge efficiency was caluculated by substituting the found values in the equation set forth above. The results are shown in Table 1.

TABLE 1

| Electrolytic Solution No. | Charge-Discharge Efficiency at Li Anode in 1.5 M $LiAsF_6$-EC/2MeTHF(1/1) System | | | | |
|---|---|---|---|---|---|
| | Water (ppm) | Impurities 2-MeF | (ppm) Other Impurities | Charge-Discharge Efficiency (%) | $1/(1-E)$ |
| 1 | 790 | — | 490 | 91.7–92.3 | 12–13 |
| 2 | 130 | 6200 | 6500 | 93.3 | 15 |
| 3 | 370 | 970 | 32 | 95.0 | 20 |
| 4 | 117 | 970 | 30 | 94.7–95.7 | 19–23 |
| 5 | 27 | 20 | 30 | 96.2–96.6 | 26–29 |
| 6 | 27 | 10000 | 30 | 95.2–96.7 | 21–30 |

Note:
EC = Ethylene Carbonate
2-MeTHF = 2-Methyltetrahydrofuran
2-MeF = 2-Methylfuran
E = Value of Charge-Discharge Efficiency Divided by 100

Comparing the result for the electrolytic solution No. 1 with the result for the electrolytic solution No. 3 and comparing the result for the electrolytic solution No. 4 with the result for the electrolytic solution No. 5, respectively, it will be seen that the value of E is increased as the water content in the electrolytic solution is decreased. Comparing the result for the electrolytic solution No. 2 with the result for the electrolytic solution No. 4, it is seen that the value of E is increased as the content of impurities other than water is decreased. It is thus found that the charge-discharge efficiency of the lithium battery, according to this invention, has been improved considerably by removing water and impurities other than water. In view of the finding described above, the water content of the electrolytic solution should be not more than 400 ppm, preferably not more than 5 ppm. It is preferred that the content of impurities other than water should be 1000 to 10 ppm to obtain particularly high charge-discharge efficiency. Further comparing the result for the electrolytic solution No. 5 with the result for the electrolytic solution No. 6, we have found a fact contrary to the report (J. Electrochem. Soc., vol 131, 2197 (1984)) which describes that the presence of 2-methylfuran (2MeF) is effective for the improvement in charge-discharge efficiency. An electrolytic solution having a composition closely approximate to that of the elctrolytic solution No. 4 was used in the following Examples, unless otherwise specified.

Figure 2:
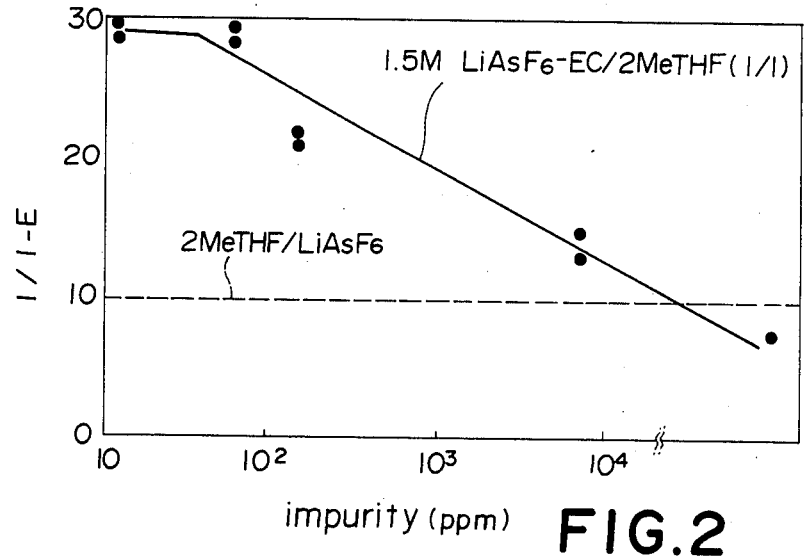
FIG. 2 is a graph showing the cycle life of a Li/amorphous $V_2O_5$-$P_2O_5$ cell in terms of the impurities in an electrolytic solution of EC/2MeTHF(1/1)-1.5 mol $LiAsF_6$.

FIG. 2 shows the cycle life of a Li/amorphous $V_2O_5$-$P_2O_5$ cell in terms of the impurities contained in the electrolytic solution. The real line and the broken line indicate the difference between the case where a mixed solvent of EC/2MeTHF(1/1) was used and the case where 2MeTEF was used. The EC/2MeTHF(1/1) used in this invention was highly purified through precise distillation and molecular sieve treatment followed by treating with activated alumina. The ordinate indicates $1/(1-E)$ which changes in proportion to the cycle life. It is preferred that the content of impurities should be as low as possible.

EXAMPLE 2

1.5M $LiAsF_6$-EC/(2-MeTHF) (Mixing Ratio by Volume: 1:1) was used as the electrolytic solution, the dipolarizing mix pellets for cell (16 mm$\phi$) being composed of 70 wt % of an amorphous $V_2O_5$ having a composition of 95 mol % $V_2O_5$-5 mol % $P_2O_5$, 25 wt % of acetylene black acting as a conductive agent, and 5 wt % of Teflon acting as a binder. Metallic lithium (16 mm$\phi$, 90 mAh) was used as the anode. A microporous polypropylene sheet acting as a separator was used together with the aforementioned materials to produce a coin-shape lithium battery (23 mm$\phi$, 2 mm thick).

Figure 3:
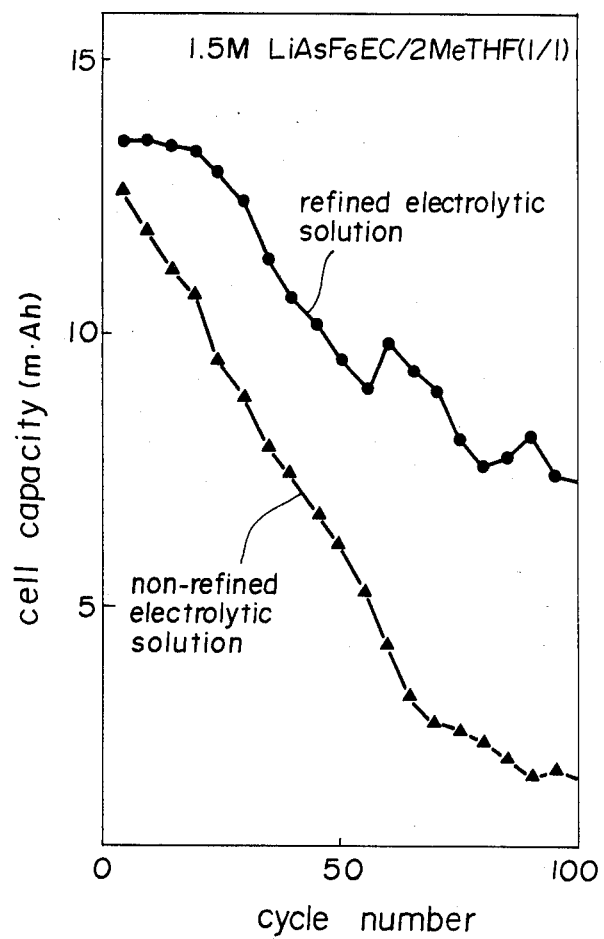
FIG. 3 illustrates the interrelation between the cycle number and the cell capacity of Li/amorphous $V_2O_5$-$P_2O_5$ cells wherein purified and unpurified electrolytic solutions of EC/2MeTHF(1/1)-1.5 mol $LiAsF_6$ are used respectively.

The charge-discharge cycle test of the cell was conducted at a discharge current of 2 mA, at a charge current of 2 mA and at a voltage of 2 to 3.5 volts. The result obtained by using a purified electrolytic solution of 1.5M LiAsF$_6$-EC/2MeTHF(1/1) was compared with that obtained by using an unpurified electrolytic solution. FIG. 3 illustrates the cycle characteristics of the Li/amorphous $V_2O_5$ cells wherein the aforementioned purified and unpurified electrolytic solutions were used. It will be seen that the capacity at each successive cycle is increased and the cycle life is prolonged by the use of a purified electrolytic solution.

EXAMPLE 3

An electrolytic solution was prepared by dissolving 1.5 mol LiAsF$_6$ in a mixed solvent of EC and 2-MeTHF. The conductivity of the electrolytic solution was measured. The electrolytic solution prepared by the use of the mixed solvent of EC and 2-MeTHF had a higher conductivity than that of the elctrolytic solution prepared by the use of a single solvent. By the use of a mixed solvent of EC and 2-MeTHF mixed in a ratio by volume of $\frac{2}{3}$, a maximum conductivity of $9.8 \times 10^{-3}$ Scm$^{-1}$ was obtained at 25° C., which corresponds to 1.6 times and 2.3 times as high as those obtainable by the use of the electrolytic solutions prepared by the single use of EC and 2MeTHF. The maximum conductivity, at $-$(minus)10° C., of the system using the mixed solvent of EC/2MeTHF was $4.6 \times 10^{-3}$ Scm$^{-1}$, which was higher than that obtained by the system where 2MeTHF was used singly, the maximum conductivity obtained by the use of the latter mentioned system being $3 \times 10^{-3}$ Scm$^{-1}$. 2MeTHF has a much higher solvation power to Li$^+$ than that of EC. In the EC/2MeTHF mixed solvent system, Li$^+$ is selectively solvated by 2MeTHF. When 2MeTHF is used singly, a complex formed by 2MeTHF and Li$^+$ is not dissolved at a low temperature. In contrast thereto, it is considered that the EC/2MeTHF mixed solvent system has an improved conductivity not to exhibit such an adverse influence on the transfer of Li$^+$. In an electrolytic solution of LiAsF$_6$-EC/2MeTHF(3/7) system, the interrelation between the concentration or content of LiAsF$_6$ and the obtained conductivity revealed that an excellent conductivity was obtainable when the concentration of LiAsF$_6$ was within the range of from 0.5 to 2.0 mols. Particularly high conductivity of about $10^{-2}$ Scm$^{-1}$ was obtained.

EXAMPLE 4

Using 1.5M LiAsF$_6$-EC/2-MeTHF as the electrolytic solution, the charge-discharge efficiency of lithium was determined. The charge-discharge efficiency was determined in accordance with the following procedure while assembling a cell wherein platinum was used as the working electrode, lithium was used as the counter electrode and lithium was used as the reference electrode. Initially, by feeding a constant current of 0.5 mA/cm$^2$ for 80 minutes to deposit lithium on the platinum electrode (2.4 C/cm$^2$), the cycle test was repeated such that a portion (0.6 C/cm$^2$) of the thus deposited lithium was discharged as Li$^+$ ions, followed by repeated recharge and discharge at a capacity of 0.6 C/cm$^2$ for each cycle.

The charge-discharge efficiency ($E_a$) was obtained by the change in potential of the platinum electrode. $E_a$ may be obtained from the following equation (1), assuming that the cycle number exhibiting apparent efficiency of 100% is n times.

$$E_a = \left[ \frac{0.6 - \frac{2.4 - 0.6}{n}}{0.6} \right] \times 100(\%) \quad (1)$$

Figure 4:
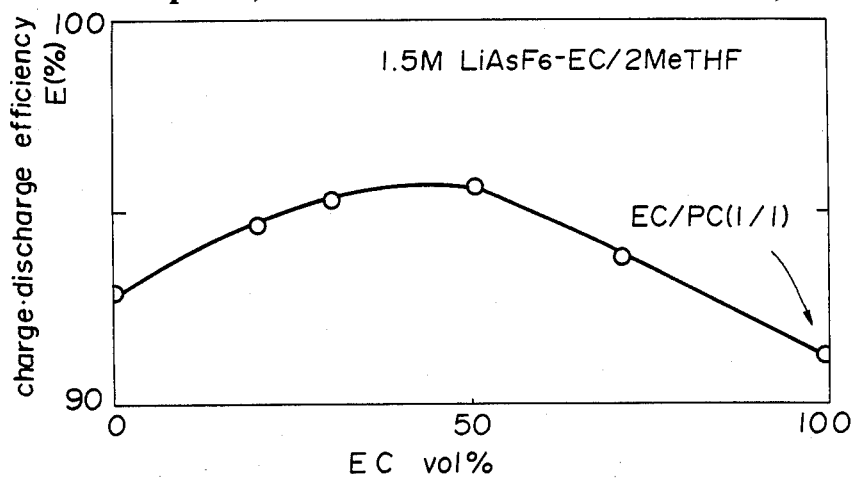
FIG. 4 illustrates the interrelation between the charge-discharge efficiency and the mixed amount of ethylene carbonate.

FIG. 4 illustrates the interrelation between the charge-discharge efficiency and the mixed ratio by volume of EC when a 1.5M LiAsF$_6$-EC/2MeTHF electrolyte was used. The $E_a$ value obtainable by the use of the mixed solvent, according to this invention, was higher than those obtainable by the solitary use of EC or 2MeTHF, and particularly superior results were exhibited when the mixed amount (by volume) of EC was in the range of from 10 to 50 vol %.

EXAMPLE 5

Figure 5:
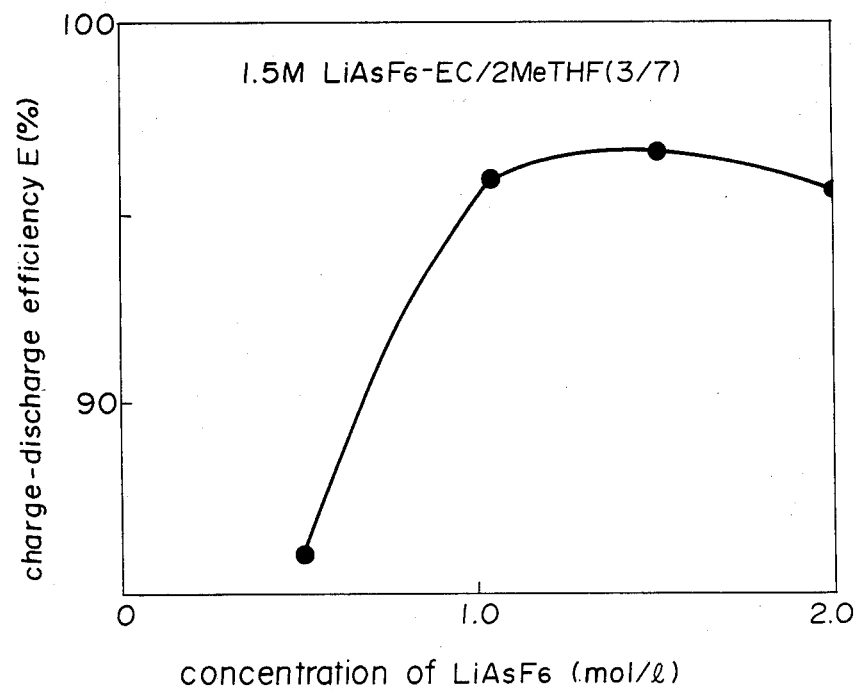
FIG. 5 illustrates the interrelation between the charge-discharge efficiency of lithium and the concentration of $LiAsF_6$.

FIG. 5 illustrates the interrelation between the concentration of LiAsF$_6$ and $E_a$ when a LiAsF$_6$-EC/2MeTHF(3/7) was used. Particularly excellent results were found within a concentration of LiAsF$_6$ (mol/1) ranging from 1.0 to 1.5 mols.

EXAMPLE 6

A cell was produced by using, as the electrolyte, 1.5M LiAsF$_6$-EC/2MeTHF(3/7), Li/Al (an alloy of atomic ratio of 9/1, having an electrochemical discharge capacity of Li of 10 mAh) as the working electrode, a Li plate (200 mAh) as the counter elctrode and Li as the reference electrode. A cycle test was conducted wherein charge and discharge operations were repeated at 1 mA for 5 hours. The results are shown in Table 2.

TABLE 2

| Charge-Discharge Efficiency of Lithium in Li/Al Alloy | |
|---|---|
| Electrolyte | Charge-Discharge Efficiency of Lithium (%) |
| 1.5 M LiAsF$_6$—EC/2MeTHF(3/7) | 95.7 |
| 1.5 M LiAsF$_6$—2MeTHF | 95.0 |

As seen, by the use of a mixture of EC/2MeTHF as the solvent for the electrolyte, a higher charge-discharge efficiency of LiAsF$_6$ over that obtainable by the solitary use of 2MeTHF can be obtained.

Figure 6:
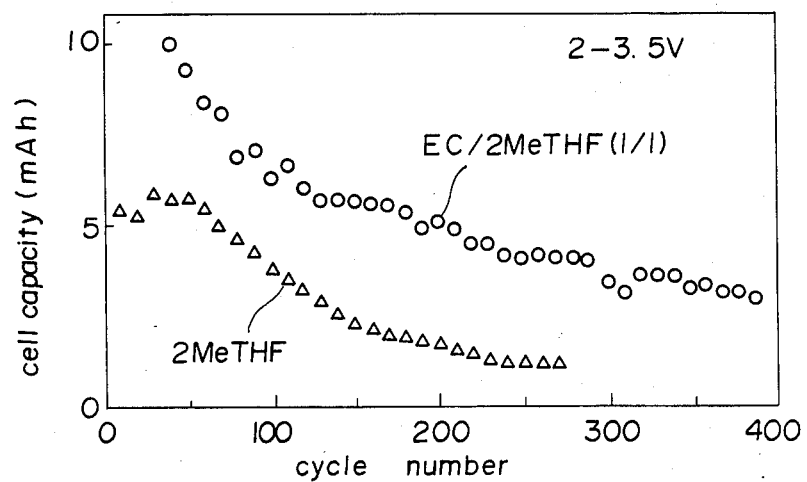
FIG. 6 illustrates the performance characteristics of Li/amorphous $V_2O_5$-$P_2O_5$ cells wherein EC/2MeTHF and 2MeTHF are used.

1.5M LiAsF$_6$-EC/2MeTHF was used and the electrolyte with the use of a cathode active material formed by dipolarizing mix pellets (16 mm$\phi$) containing 70 wt % of an amorphous $V_2O_5$ having a composition of 95 mol$V_2O_5$-5 mol$P_2O_5$, 25 wt % of acetylene black acting as a conductive material and 5 wt % of Teflon acting as a binder. Metallic lithium (16 mm$\phi$, 200 mAh) was used as the anode. A coin-shape lithium battery (23 mm$\phi$, 2 mm thick)was produced from the aforementioned materials together with a separator made of a microporous polypropylene sheet. The results of charge-discharge cycle tests shown in FIG. 6 were obtained by the comparison tests using a 1.5M LiAsF$_6$-EC/2MeTHF(1/1) system and a 1.5M LiAsF$_6$-2MeTHF system and conducted at room temperature under the conditions that the discharge current was set to 6 mA and charge current was set to 2 mA both at a voltage of 2 to 3.5 volts. In these cells, the quantity of the cathode active material was 84 mg for the cell using the EC/2MeTHF, and that in the cell solely using 2-MeTHF was 97 mg. The discharge capacity for each cycle in the cell using the Ec/2MeTHF(1/1) was generally larger than that in the cell solely using the 2MeTHF, with the cycle number until the discharge capacity of the former cell reached ½ of the initial capacity being 250 times, whereas that for the latter cell being 120 times. It is considered that such a drop in capacity is caused by the increase in resistance internally of each cell due to the rise of the open circuit voltage with the increase in cycle number. After the completion of cycle test, the same cathode plate was used to assemble a cell again to find that no appreciable deterioration in performance characteristics was observed. In view of this fact, it is considered that the aforementioned increase in resistance has been attributed to the Li electrode.

The charge-discharge efficiencies of Li were calculated from the data on the cycle number until the cell capacity reached 3 mAh and on the quantity of remaining Li to find that the efficiency for the EC/2MeTHF cell was 95.7% (1/(1−E)=23) whereas that for the cell only using 2-MeTHF was 87.0% (1/(1−E)=8).

Figure 7:
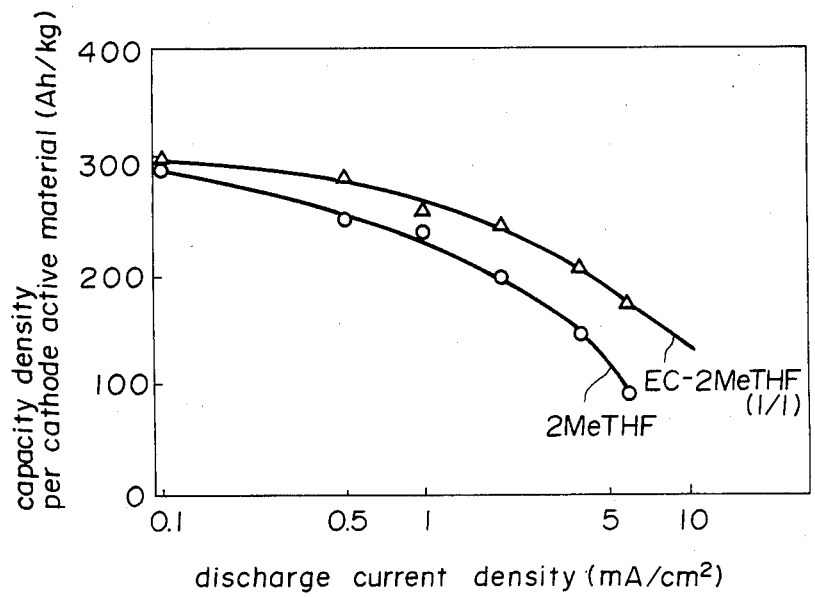
FIG. 7 illustrates the performance characteristics of Li/amorphous $V_2O_5$-$P_2O_5$ cells wherein EC/2MeTHF and 2MeTHF are used.

The same coin-shape cells were subjected to constant current discharge test at varied current densities of from 0.1 to 6 mA/cm$^2$ to learn the discharge capacities until the voltage dropped to 2.0 volts. The result are shown in FIG. 7. As seen from FIG. 7, the EC/2MeTHF mixed solvent system provided a higher charge capacity as compared to that obtainable by the solitary 2MeTHF solvent system.

EXAMPLE 7

Figure 8:
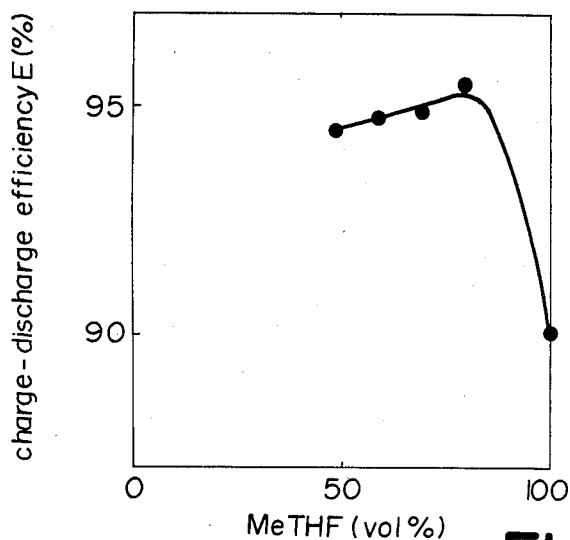
FIG. 8 illustrates the interrelation between the mixed amount (vol %) of 2MeTHF and the charge-discharge efficiency of a cell wherein 1.5 mol $LiAsF_6$-EC/2MeTHF system electrolytic solution is used.

A coin-shape cell was produced generally similar to that produced in Example 6, except that metallic lithium was charged on the cathode in an amount corresponding to an electricity of 30 mAh (10 mm$\phi$, 0.21 mm thick). Charge-discharge tests were conducted at room temperature, at a current of 1 mA and at a voltage of from 2 to 3.5 volts. Similarly as in Example 1, the charge-discharge characteristics for respective electrolytes were appraised. FIG. 8 shows the interrelation between the change in charge-discharge efficiency in a 1.5M-LiAsF$_6$-EC/2MeTHF electrolyte cell depending on the change in mixed amount (vol %) of 2MeTHF. The cell using an electrolyte containing 60 to 80 vol % of 2MeTHF had a higher efficiency than that obtainable by the use of a mixed electrolyte containing 50 vol % of 2MeTHF.

EXAMPLE 8

Figure 9:
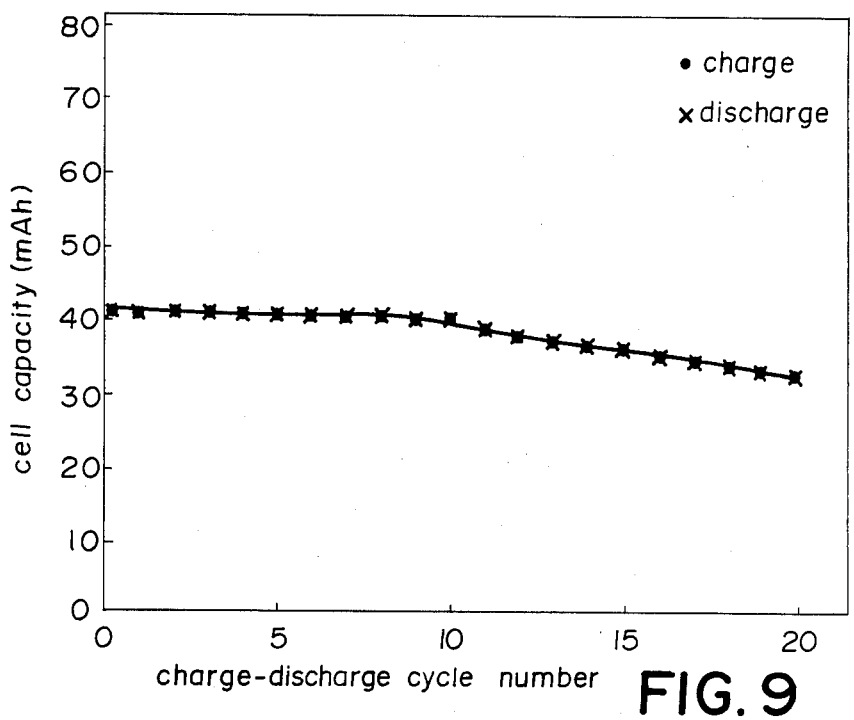
FIG. 9 illustrates the interrelation between the cell capacity and the charge-discharge cycle number of a Li/amorphous $V_2O_5$-$P_2O_5$ cell wherein 1.5 mol $LiAsF_6$-EC/2MeTHF system electrolytic solution is used.

Using 19 mm$\phi$ cathode dipolarizing mix pellets and metallic lithium of 16 mm$\phi$ and 90 mAh, and using similar 1.5M-LiAsF$_6$/2MeTHF(3/7) with the exceptions that the water content was 5 ppm and the content of impurities other than water was 10 ppm, a coin-shape cell (23 mm$\phi$, 2 mm thick) was produced generally following to the procedure described in Example 6. The cell was subjected to repeated charge-discharge test which was conducted at room temperature, at a current of 2 mA and at a voltage of from 2 to 3.5 volts. FIG. 9 shows the change in capacity of the cell with the increase in cycle number, wherein the discharge operation is plotted by the marks ● and the charge operation is plotted by the marks X.

The initial capacity was 40 mAh. The energy concentration was so high as 48.1 mA/cc, 125 Wh/l. Since the difference between the discharge capacity and the charge capacity at the first cycle corresponds to the quantity of Li which does not come out of the cathode during the charge operation, the total amount of Li consumed by the 20th cycle is 90−35−32=23 mAh. From this value and the integrated charge capacity by the 20th cycle, the charge-discharge efficiency of lithium was caluculated as of 97.0% (1/(1−E)=23.4).

EXAMPLE 9

Coin-shape cells were produced generally similar to Example 6, except that used cathode active materials were amorphous V$_2$O$_5$ having, respectively, the composition of 80 mol % V$_2$O$_5$-20 mol % MoO$_3$ and the composition of 80 mol % V$_2$O$_5$-20 mol % WO$_3$. These cell were subjected to a charge-discharge test conducted at 1 mA and at 140 Ah/kg. The used electrolyte was 1.5M LiAsF$_6$-EC/2MeTHF. The results are shown in Table 3.

TABLE 3

| Cathode Active Material | Electrolytic Solution | |
|---|---|---|
| | 1.5 M LiAsF$_6$— EC/2MeTHF(1/1) | 1.5 M LiAsF$_6$— MeTHF |
| V$_2$O$_5$—MoO$_3$ | 248 | 139 |
| V$_2$O$_5$—WO$_3$ | 290 | 163 |

EXAMPLE 10

Electrolytes were prepared by dissolving 1 to 1.5 mols of LiAsF$_6$ in ternary mixed solvents each composed of
  (1) ethylene carbonate (EC); and
  (2) 2-methyltetrahydrofuran(2MeTHF); added with
  (3) one of other additional solvents selected from tetrahydrofuran (THF), methyl formate (MF), acetonitrile (AN), 1,2-dimethoxyethane (DME), 1,3-dioxolane (DOL), methyl acetate (MA), 1,2-diethoxyethane (DEE) or the like.

In addition to the aforementioned ternary solvents, prepared were the following mixed solvents:
  1.5M LiAsF$_6$-EC/propylene carbonate (PC)/2-MeTHF/THF (mixed in a ratio by volume of 1/1/1/1);
  0.75M LiAsF$_6$/0.75M LiPF$_6$/EC/2MeTHF; and
  1.5M LiPF$_6$/EC/2Me-THF The charge-discharge efficiencies of lithium in the cells produced by the use of these electrolytes were determined. The charge-discharge efficiency (E$_a$) of each cell was determined in the following manner, while each of the aforementioned electrolytes were combined with a platinum plate acting as the working electrode, lithium acting as the counter electrode and lithium acting as the reference electrode. At the first step of the determination procedure, lithium is deposited on the platinum electrode by supplying a constant current of 0.5 mA/cm$^2$ for 160 minutes until the deposited lithium reached 4.8 C/cm$^2$. Then, a portion (1.2 C/cm$^2$) of the deposited lithium was discharged as Li$^+$ ions. Thereafter, each cell was charged at a charge capacity of 1.2 C/cm$^2$. The cyclic discharge and charge operations were repeated. The charge-discharge efficiency (E$_a$) was determined from the change in potential of the platinum electrode. Let the cycle numer, at which the apparent efficiency was 100%, be n, $E_a$ may be calculated from the following equation (2) of:

$$E_a = \left[ \frac{1.2 - \frac{4.8 - 1.2}{n}}{1.2} \right] \times 100(\%) \quad (2)$$

The results are shown in Table 4. It had found that the charge-discharge efficiencies of lithium in these mixed solvents containing EC as the main ingredient were high.

TABLE 4

| Sample No. | Electrolytic Solution | Charge-Discharge Efficiency (%) |
| --- | --- | --- |
| 1 | 1.5 M LiAsF$_6$—EC/2Me—THF/THF(1/1) | 96.1 |
| 2 | 1.5 M LiAsF$_6$—EC/2MeTHF/MF(4/5/6) | 91.1 |
| 3 | 1.0 M LiAsF$_6$—EC/2MeTHF/AN(4/1/6) | 95.2 |
| 4 | 1 M LiAsF$_6$—EC/PC/2MeTHF/THF(1/1/1/1) | 95.2 |
| 5 | 1.5 M LiAsF$_6$—EC/2MeTHF/DME(1/1/1) | 93.1 |
| 6 | 1 M LiAsF$_6$—EC/2MeTHF/DME(1/1/1) | 95.0 |
| 7 | 1 M LiAsF$_6$—EC/2MeTHF/MA(1/1/1) | 91.5 |
| 8 | 1.5 M LiAsF$_6$—EC/2MeTHF/DEE(1/1/1) | 93.5 |
| 9 | 1.5 M LiAsF$_6$—EC/2MeTHF(1/1) | 90.2 |
| 10 | 0.75 M LiAsF$_6$/0.75 M LiAsF$_6$—EC/2MeTHF(1/1) | 96.2 |

EXAMPLE 11

Figure 10:
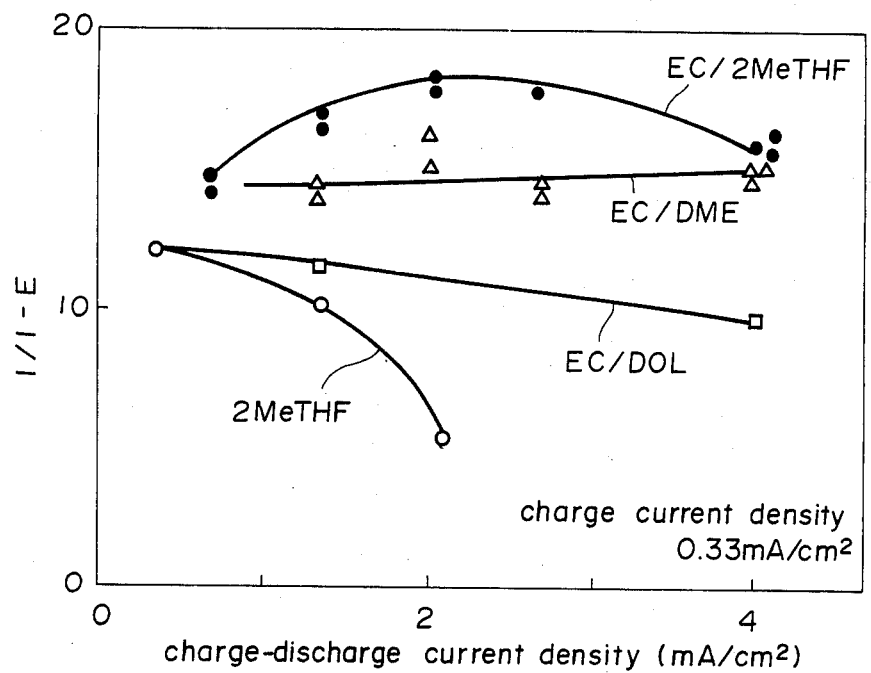
FIG. 10 illustrates the interrelation between the cycle life and the discharged current density of Li/amorphous $V_2O_5$-$P_2O_5$ cells wherein mixed solvents of ethylene carbonate are used.

Lithium cells were produced generally following to the procedure as described in Example 2. The cells were subjected to charge-discharge tests conducted within the voltage range of from 2 to 3.5 volts. The current density at the charge operation was 0.33 mA/cm$^2$, and the current density at the discharge operation ranged between 0.5 to 4.0 mA/cm$^2$. The results are shown in FIG. 10. As seen from the Figure, by the use of electrolytic solutions containing mixed solvents of EC added with proper additional solvents, the discharge current could be increased and the cycle lives could be prolonged, as compared to those of a cell containing 2MeTHF as a single solvent.

EXAMPLE 12

1.5M LiAsF$_6$-EC/2-methyl-1,3-dioxolane(2MeDOL) (mixed in a ratio by volume of ⅔) was refined to remove impurities contained therein, from which electrolytic solutions were prepared. Similarly as in Example 1, coin-shape lithium cells were produced. The thus produced lithium cells were subjected to charge-discharge tests which were conducted at room temperature, at 1 mA and at a voltage within the range of from 2 to 3.5 volts. The charge-discharge efficiencies were calculated, similarly as in Example 1. Following Table 5 shows the charge-discharge efficiencies at the Li anode in a 1.5M LiAsF$_6$-EC/2MeDOL(⅔) electrolytic solution.

TABLE 5

| Electrolytic Solution No. | Water (ppm) | Impurities other than Water (ppm) | Charge-Discharge Efficiency (%) | 1/(1-E) |
| --- | --- | --- | --- | --- |
| 1 | 800 | 27000 | 90.5 | 10.5 |
| 2 | 110 | 900 | 92.9 | 14.1 |
| 3 | 35 | 350 | 94.3 | 17.5 |

TABLE 5-continued

| Electrolytic Solution No. | Water (ppm) | Impurities other than Water (ppm) | Charge-Discharge Efficiency (%) | 1/(1-E) |
| --- | --- | --- | --- | --- |
| 4 | 30 | 150 | 95.7 | 23.2 |

Note:
EC = Ethylene Carbonate
2MeDOL = 2-Methyl-1,3-dioxolane
E: The value of charge-discharge efficiency divided by 100.

It should be clearly appreciated from Table 5 that the charge-discharge efficiency was remarkedly improved by removing water and impurities other than water. In order to acquire an acceptably high charge-discharge efficiency, the water content of the electrolytic solution should be not more than 110 ppm, preferably not more than 5 ppm.

Similarly, acceptably high charge-discharge efficiency was obtainable when the content of impurities other than water was not more than 1000 ppm, preferably not more than 10 ppm.

Each of the used electrolytic solutions was prepared by dissolving LiAsF$_6$ in either one of the mixed solvents mainly composed of ethylene carbonate, and mixed with 2-methyl-1,3-dioxolane, 1,3-dioxolane or 4-methyl-1,3-dioxolane. Similarly as in Example 4, the charge-discharge efficiencies ($E_a$) of the cells were calculated. The charge-discharge efficiencies for respective electrolytes are shown in Table 6.

TABLE 6

| Sample No. | Electrolytic Solution | Charge-Discharge Efficiency (%) |
| --- | --- | --- |
| 1 | 1.5 M LiAsF$_6$—EC/2MeDOL(3/7) | 95.2 |
| 2 | 1.5 M LiAsF$_6$—EC | 90.2 |
| 3 | 1.5 M LiAsF$_6$—EC/DOL(2/3) | 93.2 |
| 4 | 1.5 M LiAsF$_6$—EC/4MeDOL(2/3) | 94.0 |

Note:
EC = Ethylene Carbonate
2MeDOL = 2-Methyl-1,3-dioxolane
DOL = 1,3-dioxolane
4MeDOL = 4-Methyl-1,3-dioxolane

EXAMPLE 13

A lithium cell was produced similarly as in Example 6, except that 1.5M LiAsF$_6$-EC/2MeDOL(⅔) was used. The cell was subjected to charge-discharge test conducted at room temperature, at a charge current density of 1 mA/cm$^2$, at a discharge current density of 3 mA/cm$^2$ and at a voltage within the range of from 2 to 3.5 volts. The electrolytic solution of this Example was used in a Li/V$_2$O$_5$-P$_2$O$_5$ cell which was subjected to the charge-discharge cycle test. For the comparison purpose, a similar Li/V$_2$O$_5$-P$_2$O$_5$ cell was prepared by using 1.5M LiAsF$_6$/2-methyltetrahydrofuran system electrolytic solution, and subjected to the same charge-discharge cycle test. The results are illustrated in FIG. 11.

Figure 11:
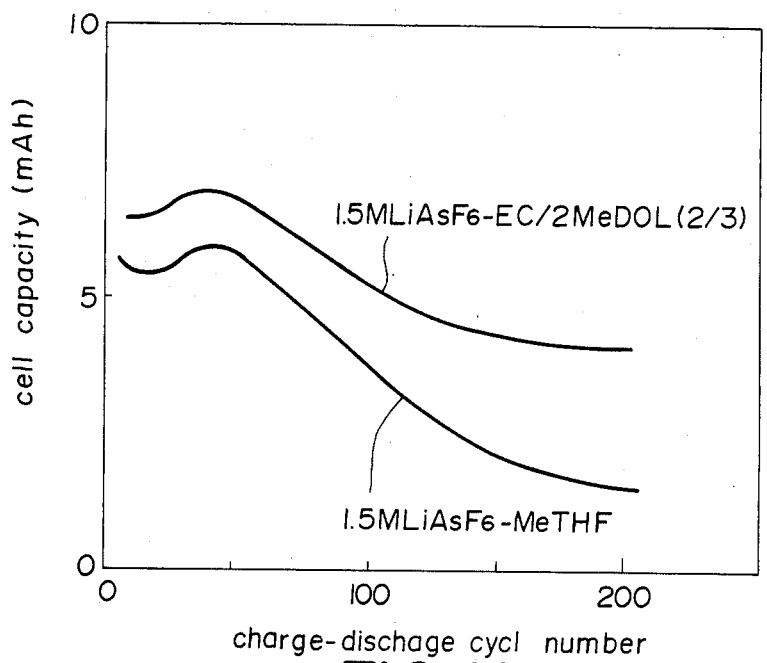
FIG. 11 illustrates the interrelation between the capacity and the charge-discharge efficiency of a Li/amorphous $V_2O_5$-$P_2O_5$ cell wherein 1.5 mol $LiAsF_6$-ethylene carbonate/2-methyl-1,3-dioxolane electrolytic solution is used.

As seen from FIG. 11, the charge capacity of each cycle was increased to show cycle characteristics superior over those obtainable by the single use of 2MeTHF, when a PC/2MeDOL mixed solvent system was used.

EXAMPLE 14

1.5M LiAsF$_6$-EC/propylene carbonate (PC) (mixed in a ratio by volume of 1/1) was refined to remove impurities, from which an electrolytic solution was prepared.

A coin-shape lithium cell was produced similarly as in Example 1 while using the thus prepared electrolytic solution. The lithium cell was subjected to charge-discharge test conducted at room temperature and at a current of 1 mA within the voltage range of from 2 to 3.5 volts. The charge-discharge efficiency of the electrolytic solution was calculated in the manner as described in Example 1. The following Table 7 shows the charge-discharge efficiencies at the Li anode of various 1.5M LiAsF$_6$-EC/PC(1/1) which were varied in impurity content.

TABLE 7

Charge-Discharge Efficiency in 1.5 M LiAsF$_6$—EC/PC(1/1) System Mixed Solvent

| Electrolytic Solution No. | Water (ppm) | Impurities other than Water (ppm) | Charge-Discharge Efficiency (%) | 1/(1-E) |
|---|---|---|---|---|
| 1 | 750 | 28000 | 88.3 | 8.55 |
| 2 | 150 | 900 | 88.9 | 9.01 |
| 3 | 27 | 700 | 90.2 | 10.2 |
| 4 | 20 | 160 | 93.7 | 15.9 |

Table 7 shows that the charge-discharge efficiency was remarkedly improved by removing water and impurites other than water. In order to acquire an acceptably high charge-discharge efficiency, the water content of the electrolytic solution should be not more than 150 ppm, preferably not more than 50 ppm. Similarly, acceptably high charge-discharge efficiency was obtainable when the content of impurities other than water was not more than 1000 ppm, preferably not more than 10 ppm.

Generally following to the procedure as described in Example 4, the charge-discharge efficiency of lithium was determined except that the solvents for the electrolytic solutions were ethylene carbonate mixed with propylene carbonate (PC), dimethylsulfoxide (DMSO), methyl formate (MF) and methyl acetate (MA). Similarly as in Example 4, cells were produced while using the electrolytes prepared by dissolving LiAsF$_6$ in the aforementioned mixed solvents, and the charge-discharge efficiencies of lithium in these cells were determined.

TABLE 8

| Sample No. | Electrolytic Solution | Charge-Discharge Efficiency (%) |
|---|---|---|
| 1 | 1.5 M LiAsF$_6$—PE/PC(1/1) | 93.7 |
| 2 | 1.5 M LiAsF$_6$—PC | 86.5 |
| 3 | 1.0 M LiAsF$_6$—EC/DMSO (i/1) | 90.4 |
| 4 | 1.0 M LiAsF$_6$—DMSO | 86.1 |
| 5 | 1.5 M LiAsF$_6$—EC/MF(2/3) | 90.4 |
| 6 | 1.5 M LiAsF$_6$—MF | 86.0 |
| 7 | 1.5 M LiAsF$_6$—EC/MA(2/3) | 91.2 |
| 8 | 1.5 M LiAsF$_6$—MA | 88.9 |

Note:
EC = Ethylene Carbonate
PC = Propylene Carbonate
DMSO = Dimethylsulfoxide
MF = Methyl Formate
MA = Methyl Acetate

EXAMPLE 15

A lithium cell was produced similarly as in Example 6, except that 1.5M LiAsF$_6$-EC/PC(1/1) was used. The cell was subjected to charge-discharge test conducted at 25° C., at a charge current density of 1 mA/cm$^2$, at a discharge current density of 3 mA/cm$^2$ and at a voltage within the range of 2 to 3.5 volts.

Figure 12:
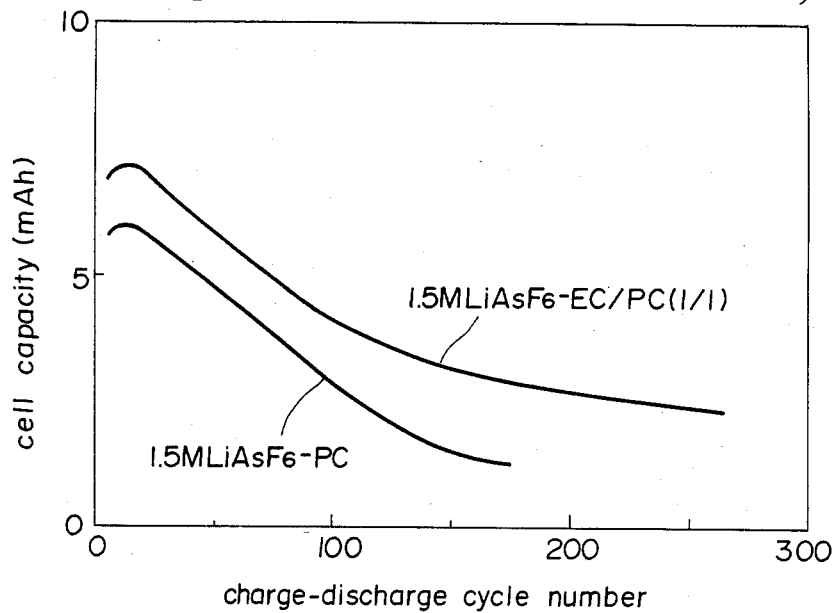
FIG. 12 illustrates the interrelation between the capacity and the charge-discharge cycle of a cell wherein 1.5 mol $LiAsF_6$-ethylenne carbonate/propylene carbonate electrolytic solution is used.

FIG. 12 shows the interrelation between the cell capacities and the charge-discharge cycle numbers found by the charge-discharge tests for Li/V$_2$O$_5$ cells, one of which the electrolyte in the 1.5M LiAsF$_6$-EC/PC(1/1) system mixed solvent was used, and the other of which 1.5M LiAsF$_6$-PC was used singly.

EXAMPLE 16

1.5M LiAsF$_6$-EC/1,2-dimethoxyethane (DME) (mixed in a ratio of 1/1 by volume) was purified by removing impurities contained therein, and lithium cells were produced similarly as in Example 1, while using the purified electrolytic solutions varied in their impurity content. Similarly as in Example 1, the contents of water and the contents of impurities other than water were analysed and the charge-discharge efficiencies were calculated. The results are shown in Table 9.

TABLE 9

Charge-Discharge Efficiency at Li Anode in 1.5 M LiAsF$_6$—EC/DME(1/1) System Mixed Solvent

| Electrolytic Solution No. | Water (ppm) | Impurities other than Water (ppm) | Charge-Discharge Efficiency (%) | 1/(1-E) |
|---|---|---|---|---|
| 1 | 800 | 28000 | 90.5 | 10.5 |
| 2 | 250 | 26000 | 92.8 | 13.5 |
| 3 | 240 | 18000 | 93.0 | 14.3 |
| 4 | 90 | 900 | 94.4 | 17.7 |
| 5 | 40 | 900 | 94.8 | 19.2 |
| 6 | 40 | 220 | 95.0 | 20.8 |
| 7 | 27 | 220 | 95.2 | 21.0 |

Note:
EC = Ethylene Carbonate
DME = 1,2-Dimethoxyethane
E: The value of charge-discharge efficiency divided by 100.

The charge-discharge efficiency was remarkably improved by removing water and impurities other than water. In order to acquire an acceptably high charge-discharge efficiency, the water content of the electrolytic solution should be not more than 100 ppm, preferably not more than 5 ppm. Similarly, acceptably high charge-discharge efficiency was obtainable when the content of impurities other than water was not more than 18000 ppm, preferably not more than 10 ppm.

Generally following to the procedure as described in Example 4, the charge-discharge efficiency of lithium was measured except that the solvents for dissolving LiAsF$_6$ were ethylene carbonate mixed with 1,2-dimethoxyethane, 1,2-diethoxyethane or 1,2-dibutoxyethane. Similarly as in Example 4, cells were produced while using the electrolytic solutions prepared by dissolving LiAsF$_6$ in the aforementioned mixed solvents, and the charge-discharge efficiencies of lithium in these cells were measured. The results are shown in Table 10.

TABLE 10

| Sample No. | Electrolytic Solution | Charge-Discharge Efficiency (%) |
|---|---|---|
| 1 | 1.5 M LiAsF$_6$—EC/DME(1/1) | 94.5 |
| 2 | 1.5 M LiAsF$_6$—EC | 90.2 |
| 3 | 1.5 M LiAsF$_6$—EC/DEE(2/3) | 95.0 |
| 4 | 1.0 M LiAsF$_6$—DEE | 86.9 |

TABLE 10-continued

| Sample No. | Electrolytic Solution | Charge-Discharge Efficiency (%) |
|---|---|---|
| 5 | 1.5 M LiAsF$_6$—EC/DBE(2/3) | 90.5 |

Note:
EC = Ethylene Carbonate
DME = 1,2-Dimethoxyethane
DEE = 1,2-diethoxyethane,
DBE = 1,2-Dibutoxyethane

EXAMPLE 17

A lithium cell was produced similarly as in Example 6, except that 1.5M LiAsF$_6$-EC/1,2-dimethoxyethane (DME) mixed in a ratio of (1/1) by volume was used. The cell was subjected to charge-discharge test conducted at 25° C., at a charge current density of 1 mA/cm$^2$, at a discharge current density of 3 mA/cm$^2$ and at a voltage within the range of from 2 to 3.5 volts.

Figure 13:
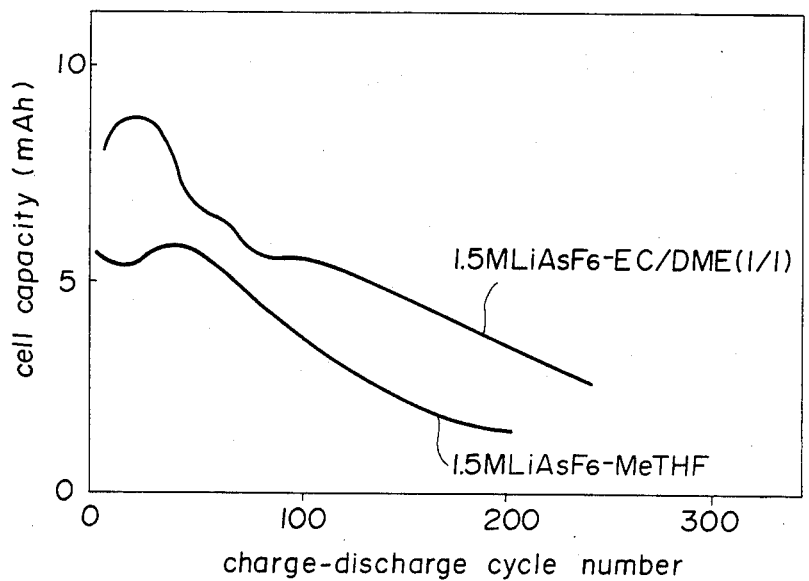
FIG. 13 illustrates the interrelation between the capacity and the charge-discharge cycle of a cell wherein 1.5 mol $LiAsF_6$-ethylene carbonate/dimethoxyethane electrolytic solution is used.

FIG. 13 shows the interrelation between the cell capacities and the charge-discharge cycle numbers found by the charge-discharge tests for Li/V$_2$O$_5$ cells, one of which the electrolyte in the 1.5M LiAsF$_6$-EC/DME (1/1) system mixed solvent was used, and the other of which 1.5M LiAsF$_6$-2-methyltetrahydrofuran (MeTHF) was used. The cell produced by using the EC/DME mixed solvent had a larger discharge capacity at every cycle discharge operation to reveal that it had better cycle performance characteristic than those of the cell wherein 2-methyltetrahydrofuran was used as a single solvent.

EXAMPLE 18

Impurities in 1.5M LiAsF$_6$-EC/acetonitrile (AN) mixed in a ratio by volume of ⅔ were removed to prepare an electrolytic solution, and a lithium cell was produced similarly as in Example 1 while using the thus prepared electrolytic solution. The charge-discharge efficiency in terms of the contents of water and other impurities in the electrolytic solution was calculated in a similar manner as described in Example 1. The results are shown in Table 11.

TABLE 11

| Sample No. | Electrolytic Solution | Charge-Discharge Efficiency (%) |
|---|---|---|
| 1 | 1.5 M LiAsF$_6$—EC/AN(2/3) | 96.1 |
| 2 | 1.5 M LiAsF$_6$—EC | 90.2 |

Note:
EC = Ethylene Carbonate
AN = Acetonitrile

What is claimed is:

1. A secondary lithium battery comprising: an anode active material selected from the group consisting of lithium, lithium ion dischargeable lithium alloys and lithium-doped high polymers; a cathode active material reacting with lithium ions through electrochemically reversible reaction; and an electrolytic solution containing one or more lithium salts dissolved in an organic solvent; said organic solvent being a mixed solvent essentially consisting of highly pure ethylene carbonate and a polar aprotic solvent, and wherein the water content of said electrolytic solution is not more than 400 ppm and the content of impurities other than water is not more than 1,000 ppm.

2. The secondary lithium battery according to claim 1, wherein said organic solvent used in said electrolytic solution is a mixed solvent of ethylene carbonate with at least one aprotic solvent selected from the group consisting of ethers, polar aprotic solvents each having a polar double bond represented by $>C=O$ or $>S=O$ and acetonitrile, and wherein the water content of said electrolytic solution ranges within 400 to 5 ppm with the content of impurities other than water being within the range of 1,000 to 10 ppm.

3. The second lithium battery according to claim 2, wherein said organic solvent is a mixed solvent of ethylene carbonate with tetrahydrofuran or a derivative of tetrahydrofuran containing an alkyl group having not more than 4 carbon atoms.

4. The secondary lithium battery according to claim 2, wherein said organic solvent is a mixed solvent of ethylene carbonate with 1,3-dioxolan or a derivative of 1,3-dioxolan containing an alkyl group having not more than 4 carbon atoms, and wherein the water content of said electrolytic solution ranges within 100 to 5 ppm with the content of impurities other than water being within the range of 1,000 to 10 ppm.

5. The secondary lithium battery according to claim 2, wherein said organic solvent is a mixed solvent of ethylene carbonate with a dialkoxyethane having an alkoxy group having not more than 4 carbon atoms.

6. The secondary lithium battery according to claim 2, wherein said organic solvent is a mixed solvent of ethylene carbonate with an organic compound having a polar double bond represented by $>C=O$ or $>S=O$, and wherein the water content of said electrolytic solution ranges within 150 to 5 ppm with the content of impurities other than water being within the range of 1,000 to 10 ppm.

7. The secondary lithium battery according to claim 2, wherein said organic solvent is a mixed solvent of ethylene carbonate with acetonitrile.

8. The secondary lithium battery according to claim 1, wherein said cathode active material is any of an amorphous material mainly composed of V$_2$O$_5$, amorphous Cr$_3$O$_8$, Cu$_4$Mo$_6$S$_8$, Cu$_3$Mo$_6$S$_{7.9}$, MoS$_2$, MoS$_2$ with oxidized surface, MoS$_2$ containing Li, Cr$_{0.5}$V$_{0.5}$S$_2$, NbSe$_3$, TiSe$_3$, TiS$_2$, V$_6$O$_{13}$, NiPS$_3$, amorphous MoS$_3$, Cu$_2$V$_2$O$_7$, Li$_{1+x}$V$_3$O$_8$ (0<x≦1), polyacetylene, polyaniline, polypyrrole, polythiophene, polyacene or polyacenoacene.

9. The secondary lithium battery according to claim 8, wherein said amorphous material mainly composed of V$_2$O$_5$ is substantially pure V$_2$O$_5$ or V$_2$O$_5$ added with at least one selected from the group consisting of P$_2$O$_5$, TeO$_2$, Sb$_2$O$_3$, Bi$_2$O$_3$, GeO$_2$, B$_2$O$_3$, MoO$_3$, WO$_3$ and TiO$_2$.

10. The secondary lithium battery according to claim 2, wherein said lithium salt soluble in said electrolytic solution is at least one lithium salt selected from the group consisting of LiAsF$_6$, LiC$_1$O$_4$, LiBF$_4$, LiSbF$_6$, LiPF$_6$, LiAlCl$_4$, LiCF$_3$SO$_3$ and LiCF$_3$CO$_2$, and the content of said lithium salt in said electrolytic solution ranges from 0.5 to 1.5 mol/l.

11. The secondary lithium battery according to claim 3, wherein said organic solvent is a mixed solvent selected from the group consisting of a mixture of ethylene carbonate with 2-methyltetrahydrofuran, a mixture of ethylene carbonate with 2,5-dimethyltetrahydrofuran and a mixture of ethylene carbonate with methyltetrahydrofuran and tetrahydrofuran; and wherein the mixed ratio of ethylene carbonate, by volume, ranges within 10 to 50%.

12. The secondary lithium battery according to claim 4, wherein said organic solvent is a mixed solvent selected from the group consisting of a mixture of ethylene carbonate with 4-methyl-1,3-dioxolan and a mixture of ethylene carbonate with 2-methyl-1,3-dioxolan; and wherein the mixed ratio of ethylene carbonate, by volume, ranges within 10 to 60%.

13. The secondary lithium battery according to claim 5, wherein said organic solvent is a mixed solvent selected from the group consisting of a mixture of ethylene carbonate with 1,2-diethoxyethane, a mixture of ethylene carbonate with 1,2-dimethoxyethane, a mixture of ethylene carbonate with 1,2-dimethoxyethane and 2-methyltetrahydrofuran, and the combination of ethylene carbonate, 1,2-dimethoxyethane and tetrahydrofuran; and wherein the mixed ratio of ethylene carbonate, by volume, ranges within 10 to 60%.

14. The secondary lithium battery according to claim 6, wherein said organic solvent is a mixed solvent of ethylene carbonate with propylene carbonate, and wherein the mixed ratio of ethylene carbonate, by volume, ranges within 10 to 60%.

15. A secondary lithium battery comprising: an amorphous $V_2O_5$ base cathode active material; a metallic lithium base anode active material; and an electrolytic solution containing lithium salt dissolved in a mixed organic solvent; said mixed organic solvent is ethylene carbonate mixed with at least one organic solvent selected from the group consisting of 2-methyltetrohydrafuran, 2,5-dimethyltetrahydrofuran, 1,3-dioxolan, 1,2-dimetthoxyethane, 4-methyl-1,3-dioxolan, 1,2-dimethoxyethane, propylene carbonate, methyl formate, tetrahydrofuran, methyl acetate and acetonitrile; the mixed ratio of ethylene carbonate ranging within 10 to 50%; the water content in said electrolytic solution ranging within 400 to 5 ppm; and the content of impurities other than water ranging within 1000 to 10 ppm.

16. The secondary lithium battery according to claim 15, wherein said lithium salt soluble in said electrolytic solution is at least one lithium salt selected from the group consisting of $LiAsF_6$, $LiClO_4$, $LiBF_4$, $LiSbF_6$, $LiPF_6$, $LiAlCl_4$, $LiCF_3SO_3$ and $LiCF_3CO_2$, and the content of said lithium salt in said electrolytic solution ranges from 0.5 to 1.5 mol/l.

17. The secondary lithium battery according to claim 15, wherein said amorphous material mainly composed of $V_2O_5$ is substantially pure $V_2O_5$ or $V_2O_5$ added with at least one selected from the group consisting of $P_2O_5$, $TeO_2$, $Sb_2O_3$, $Bi_2O_3$, $GeO_2$, $B_2O_3$, $MoO_3$, $WO_3$ and $TiO_2$.

18. The secondary lithium battery according to claim 1, wherein the water content of said electrolytic solution is not more than 100 ppm and the content of impurities other than water is not more than 1,000 ppm.

19. The secondary lithium battery according to claim 2, wherein the water content of said electrolytic solution ranges within 100 to 5 ppm and the content of impurities other than water ranges from 1,000 to 10 ppm.

20. The secondary lithium battery according to claim 15, wherein the water content in said electrolytic solution ranges within 100 to 5 ppm and the content of impurities other than water ranges within 1,000 to 10 ppm.

* * * * *